United States Patent
Nishimoto et al.

(10) Patent No.: US 9,631,060 B2
(45) Date of Patent: Apr. 25, 2017

(54) EXTRUDED POLYETHYLENE-BASED RESIN FOAM SHEET AND INTERLEAF SHEET FOR GLASS PLATES

(71) Applicant: JSP CORPORATION, Tokyo (JP)

(72) Inventors: Takashi Nishimoto, Utsunomiya (JP); Takeshi Aoki, Nikko (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 14/420,832

(22) PCT Filed: Aug. 1, 2013

(86) PCT No.: PCT/JP2013/070855
§ 371 (c)(1),
(2) Date: Feb. 10, 2015

(87) PCT Pub. No.: WO2014/030513
PCT Pub. Date: Feb. 27, 2014

(65) Prior Publication Data
US 2015/0218332 A1 Aug. 6, 2015

(30) Foreign Application Priority Data
Aug. 23, 2012 (JP) ................................. 2012-183966

(51) Int. Cl.
| | | |
|---|---|---|
| *C08J 9/00* | (2006.01) | |
| *C08J 9/08* | (2006.01) | |
| *C08J 9/14* | (2006.01) | |
| *B32B 27/06* | (2006.01) | |
| *C08J 5/18* | (2006.01) | |
| *B32B 27/22* | (2006.01) | |
| *B32B 27/32* | (2006.01) | |

(52) U.S. Cl.
CPC ........... *C08J 9/0061* (2013.01); *B32B 27/065* (2013.01); *B32B 27/22* (2013.01); *B32B 27/32* (2013.01); *C08J 5/18* (2013.01); *C08J 9/08* (2013.01); *C08J 9/141* (2013.01); *B32B 2266/025* (2013.01); *B32B 2307/56* (2013.01); *B32B 2457/20* (2013.01); *B32B 2553/00* (2013.01); *C08J 2201/03* (2013.01); *C08J 2203/14* (2013.01); *C08J 2323/06* (2013.01); *C08J 2423/06* (2013.01); *Y10T 428/249991* (2015.04)

(58) Field of Classification Search
CPC .... B32B 27/065; B32B 2266/025; C08J 5/18; C08J 9/0061; C08J 9/08; C08J 9/141; C08J 2201/03; C08J 2203/14; C08J 2323/06; C08J 2423/06; Y10T 428/249991
See application file for complete search history.

(56) References Cited

U.S. PATENT DOCUMENTS

| | | | | |
|---|---|---|---|---|
| 4,370,378 A | * | 1/1983 | Zabrocki | B29C 67/2235 264/53 |
| 2010/0178459 A1 | * | 7/2010 | Adachi | B32B 5/18 428/138 |
| 2010/0279087 A1 | * | 11/2010 | Tokiwa | B29C 49/0005 428/212 |

FOREIGN PATENT DOCUMENTS

| | | | |
|---|---|---|---|
| CN | 101844430 A | * | 9/2010 |
| CN | 101935416 A | | 1/2011 |
| JP | 2002275298 A | * | 9/2002 |
| JP | 2007-262409 A | | 10/2007 |
| JP | 2008-007670 A | | 1/2008 |
| JP | 2008007670 A | * | 1/2008 |
| JP | 2010-247529 A | | 11/2010 |
| JP | 2011-006567 A | | 1/2011 |
| JP | 2012-020766 A | | 2/2012 |
| JP | 2012-082412 A | | 4/2012 |
| WO | 2012/105237 A1 | | 8/2012 |
| WO | 2013/054620 A1 | | 4/2013 |

OTHER PUBLICATIONS

CN 101844430 A Machine Translation.*
JP 2002275298 A Machine Translation.*
JP 2008007670 A_Machine Translation.*
International Search Report (ISR) dated Oct. 22, 2013, for PCT/JP2013/070855, and English translation thereof.
Chinese Search Report dated Jul. 21, 2015, for CN 201380042818.3, and English translation thereof.

* cited by examiner

*Primary Examiner* — Maria Veronica Ewald
*Assistant Examiner* — Travis Figg
(74) *Attorney, Agent, or Firm* — Bacon & Thomas, PLLC

(57) ABSTRACT

An extruded foam sheet having a foam layer constituted of a base resin containing low density polyethylene as a major component thereof, wherein the foam sheet has an apparent density of 45 to 450 kg/m$^3$, an average thickness of 0.03 mm or more and less than 0.3 mm and a dimensional change of −5% to 0% in the extrusion direction when heated at 80° C. for 24 hours and wherein cell walls of the foam layer have an average thickness of 6 to 70 μm. The foam sheet may be used as an interleaf sheet for glass plates.

10 Claims, No Drawings

EXTRUDED POLYETHYLENE-BASED RESIN FOAM SHEET AND INTERLEAF SHEET FOR GLASS PLATES

FIELD OF THE INVENTION

The present invention relates to an extruded polyethylene-based resin foam sheet and use thereof as an interleaf sheet for glass plates.

BACKGROUND OF THE INVENTION

Extruded polyethylene-based resin foam sheets have been primarily used as a cushioning material or a packaging material by utilization of their cushioning properties. Further, such foam sheets have been also used in recent years as an interleaf sheet to be inserted between adjacent glass plates (such as glass substrates for image display devices such as liquid crystal displays, plasma displays and electroluminescence displays) for preventing formation of scars on the surfaces thereof during transportation. Foam sheets to be used as an interleaf sheet for glass plates are disclosed in, for example, JP-A-2007-262409 and JP-A-2012-20766.

JP-A-2007-262409 discloses an extruded polyolefin-based resin foam sheet having a thickness of 0.3 to 1.5 mm and an apparent density of 18 to 180 g/L. The foam sheet is described to show a small degree of sag and to allow easy removal thereof between glass plates by vacuum suction. It is additionally described that deposition of dusts on glass plates may be suppressed because the foam sheet contains a polymeric antistatic agent and has excellent antistatic property.

JP-A-2012-20766 discloses an extruded polyethylene-based resin foam sheet having a thickness of 0.2 to 1.5 mm, an apparent density of 20 to 60 g/L and a basis weight of 10 to 50 g/m$^2$. It is described that, because the resin constituting the sheet has a bending modulus of at least 300 MPa, the foam sheet shows a small degree of sag in spite of its low apparent density and lightness in weight and has excellent usability as an interleaf sheet for glass plates.

SUMMARY OF THE INVENTION

Glass plates hitherto used for image display devices, such as liquid crystal panels, generally have a thickness of about 0.5 mm and foam sheets having a thickness of about 0.5 mm have been used as interleaf sheets for such glass plates. Recently, thin glass plates with a thickness of about 0.2 mm have been produced. When the conventional foam sheets with a thickness of about 0.5 mm are used as interleaf sheets for such thin glass plates, a reduction of the loading efficiency will result. Further, it has been found that because the thickness of the interleaf sheets is considerably greater than that of the glass plates, glass plates are broken when a load is locally applied thereto. To cope with this problem, a thought may occur to use interleaf sheets with a smaller thickness than before.

However, it is generally accepted common knowledge that the cushioning property of the foam sheet is lowered as the thickness thereof decreases. In fact, it has been found that, when a thin foam sheet is produced by increasing the take-up speed thereof, the cells thereof are excessively flattened so that the cushioning property thereof is considerably lowered and fails to satisfy a level required for cushioning materials such as interleaf sheets.

Thus, the present invention has as its object the provision of an extruded polyethylene-based resin foam sheet that has sufficient compressive strength and cushioning property even when the thickness thereof is 0.03 mm or more and less than 0.3 mm and that is sufficiently usable as an interleaf sheet for glass plates.

In accordance with a first aspect of the present invention, there is provided an extruded polyethylene-based resin foam sheet having a foam layer constituted of a base resin containing low density polyethylene as a major component thereof, wherein cell walls of said foam layer have an average thickness of 6 to 70 μm, and wherein the extruded polyethylene-based resin foam sheet has an apparent density of 45 to 450 kg/m$^3$, an average thickness of 0.03 mm or more and less than 0.3 mm and a dimensional change of −5% to 0% in the extrusion direction when heated at 80° C. for 24 hours.

In a second aspect, the present invention provides the foam sheet according to the first aspect, wherein the foam sheet has a 25% compression stress of 10 kPa or more in the thickness direction of the extruded polyethylene-based resin foam sheet.

In a third aspect, the present invention provides the foam sheet according to first or second aspect, wherein said base resin additionally contains linear low density polyethylene in an amount of 5 to 20% by weight based on the total weight of the low density polyethylene and linear low density polyethylene.

In a fourth aspect, the present invention provides the foam sheet according to any one of first to third aspects, further comprising a resin layer laminated on at least one side of said foam layer.

In a fifth aspect, the present invention provides an interleaf sheet for glass plates that is formed of the foam sheet according to any one of first to fourth aspects.

The extruded polyethylene-based resin foam sheet according to the present invention has excellent cushioning property notwithstanding its extremely small thickness because an average cell wall thickness thereof is in a specific range and a specific dimensional change thereof is in a specific range. The foam sheet, which is not only extremely thin but also has sufficient cushioning property, may be advantageously used as an interleaf sheet for packaging thin glass plates of, for example, 0.3 mm or less.

DETAILED DESCRIPTION OF THE INVENTION

The extruded polyethylene-based resin foam sheet of the present invention will be described in detail below.

The extruded polyethylene-based resin foam sheet of the present invention (hereinafter occasionally referred to simply as "foam sheet") has a non-cross-linked foam layer that is constituted of a base resin containing low density polyethylene as a major component and that is produced by extrusion foaming (hereinafter occasionally referred to simply as "foam layer"). The low density polyethylene has excellent flexibility and the foam sheet obtained therefrom is suited for use as a packaging material.

The foam sheet may be a single layer foam sheet composed only of the foam layer or a multi-layer foam sheet having a resin layer laminated on at least one side of the foam layer.

As used herein, the term "base resin containing low density polyethylene as a major component" is intended to refer to a base resin that contains low density polyethylene in an amount of at least 50% by weight, preferably at least 60% by weight, more preferably at least 70% by weight, still more preferably at least 80% by weight, particularly preferably at least 90% by weight, based on the total weight of the base resin. The low density polyethylene is a polyethylene resin that has a long-chain branching structure and that has a density of 890 kg/m³ or more and 935 kg/m³ or less, preferably 900 kg/m³ or more and 930 kg/m³ or less. The base resin has good foamability and gives a foam sheet having excellent cushioning property.

The base resin may contain additionally a polyethylene resin other than low density polyethylene in an amount of not more than 50% by weight based on the total weight of the base resin.

As the additional polyethylene resin, there may be mentioned a resin having at least 50 mol % of ethylene component units. Specific examples of the additional polyethylene resin include high density polyethylene, liner low density polyethylene, very low density polyethylene, ethylene-vinyl acetate copolymers, ethylene-methyl methacrylate copolymers, ethylene-ethyl acrylate copolymers and mixtures of two or more thereof. Above all, linear low density polyethylene which is a copolymer of ethylene and an α-olefin having 4 to 8 carbon atoms, which has a substantially linear molecular chain and which has a density of 910 kg/m³ or more and 940 kg/m³ or less, is preferred from the standpoint of excellency of cushioning property of the foam sheet and prevention of generation of pinholes in the foam sheet, which will be described hereinlater.

To the extent that the object and effect of the present invention are not impaired, the base resin may contain a thermoplastic resin other than a polyethylene-based resin, such as a polypropylene-based resin and a polystyrene resin, and an elastomer such as ethylene-propylene rubber and styrene-butadiene-styrene block copolymer. In such a case, the amount of the thermoplastic resin (other than polyethylene-based resin) and elastomer in the base resin is preferably 10% by weight or less, more preferably 5% by weight or less, based on 100% weight of the base resin. To the extent that the object and effect of the present invention are not impaired, the base resin may also be added with functional additives such as a nucleating agent, an antioxidant, an antistatic agent, a surfactant, a cell controlling agent, a heat stabilizer, a weathering agent and a UV absorbing agent, and an inorganic filler.

The low density polyethylene and other polyethylene-based resin preferably have a melt mass flow rate (MFR) of 0.2 to 10 g/10 min, from the standpoint of extrusion moldability.

The term "melt mass flow rate" is a value determined according to JIS K7210-1999, condition code D.

The foam sheet must have an apparent density of 45 to 450 kg/m³. When the apparent density is excessively low, the mechanical strength becomes so low that the foam sheet cannot be used as a packaging material such as an interleaf sheet. Too large an apparent density, on the other hand, results in insufficient cushioning property. From the above standpoint, the apparent density is preferably 50 to 300 kg/m³, more preferably 60 to 200 kg/m³. The apparent density of the foam sheet may be determined by dividing the weight (g/m²) per unit area thereof by an average thickness thereof, followed by unit conversion into [kg/m³].

It is important that the foam sheet should have an average thickness of 0.03 mm or more and less than 0.3 mm for reasons of its excellent cushioning property and capability of being used as an interleaf sheet. For the same reasons, the lower limit of the average thickness is preferably 0.05 mm, more preferably 0.07 mm, still more preferably 0.1 mm. The upper limit of the average thickness, on the other hand, is preferably 0.2 mm, still more preferably 0.15 mm.

The foam sheet, when used as an interleaf sheet for glass plates, preferably has as small a number of through-holes with a diameter of at least 1 mm as possible. More specifically, the number of through-holes with a diameter of at least 1 mm in the foam sheet produced as a continuous product is preferably not more than 1 (inclusive of 0) per 100 m length thereof. It is more preferred that the foam sheet has no through-holes. Incidentally, the foam sheet as a continuous product is wound in the form of a roll and has a length of at least 100 m, preferably at least 300 m, though the length varies with the thickness and width of the foam sheet. The upper limit of the length of the continuous product is about 1,500 m though the length varies with the thickness of the foam sheet. From the standpoint of handling efficiency, the length is generally 1,000 m or less. The width of the foam sheet is generally at least 1 m with the upper limit being about 4 m.

It is also preferred that the foam sheet of the present invention has a thickness precision which is calculated from measured values obtained by measuring the thickness of the foam sheet at every 1 cm interval throughout the width thereof and which satisfies the following requirements (1) and (2):

Thickness precision (1): any average thickness (A) [mm] in every 10 cm interval which is calculated based on the above-described measured values must be in the range of (B)×0.8 to (B)×1.2 where (B) is an average [mm] of the above measured values, and Thickness precision (2): when the whole width is divided into 5 equal sections and when the largest thickness is determined in each of the 5 sections from the measured values contained in the corresponding section, a difference between the maximum among the five largest thickness values and the minimum of the five largest thickness values is 0.08 mm or less. The foam sheet that satisfies thickness precision (1) and thickness precision (2) is free of an extraordinarily large thickness portion and has an excellent surface state and, therefore is suitably used as an interleaf for glass plates.

More specifically, the thickness of the foam sheet may be measured by using, for example, Off-Line Thickness Meter TOF-4R (manufactured by Yamabun Electronics Co., Ltd.) in a manner as follows. First, the foam sheet with a width of WT [cm] is measured for its thickness at every 1 cm interval throughout from one side end to the opposite side end thereof to obtain n-number of measured values $t_1, t_2, \ldots t_n$ [mm], where n is an integer that satisfies the formula (WT−1)<n≤WT. Next, on the basis of these n-number of measured values $t_1, t_2, \ldots t_n$, an average thickness (A) [mm] in every 10 cm interval, an average (B) [mm] of the above n-number of measured values in every 1 cm interval, and the largest thickness in each of five sections obtained by equally dividing the width of the foam sheet.

The average thickness in every 10 cm interval may be determined by calculation of $((t_1, t_2 \ldots t_{10})/10; (t_{11}, t_{12} \ldots t_{20})/10, \ldots$ and $(t_{10m-9}+t_{10m-8}+ \ldots +t_{10m})/10)$. The calculation gives m-number of the average values (m is an integer that satisfies the formula (WT−10)<10m≤WT. The thickness precision (1) requires that any of the m-number of the average values (any average thickness (A) [mm] in every 10 cm interval) must satisfy the relation of (B)×0.8≤A≤(B)×1.2.

Additionally, the largest thickness among the measured values that are contained in each of 5 sections obtained by equally dividing the whole width of the foam sheet (each section has a width of WT/5) is determined. Thereafter, the maximum value among the five largest thickness values and the minimum value of the five largest thickness values are determined. The thickness precision (2) requires that a difference between these values (namely, (maximum value)–(minimum value)) is 0.08 mm or less. The above measurement is carried out after the foam sheet is subjected to conditioning adjustment by being placed for at least 24 hours at a temperature of 23±5° C. under a relative humidity of 50%.

The above-mentioned average thickness of the foam sheet refers to the average (B).

The foam layer constituting the foam sheet of the present invention has a plurality of cells defined by cell walls thereof. It is necessary that the cell walls of the foam layer should have an average thickness of 6 to 70 μm. When the thickness of the cell walls is excessively thin, pinholes which penetrate through the foam sheet are apt to be formed. When the thickness of the cell walls is excessively thick, on the other hand, the cushioning property of the foam sheet is so lowered that the foam sheet cannot be used as a packaging material such as an interleaf sheet for glass plates. From the above point of view, the average cell wall thickness is preferably 7 to 50 μm, more preferably 8 to 40 μm.

It is preferred that an average number of cells in the thickness direction of the foam layer is 4 to 15/mm for reasons of excellency in cushioning property of the foam sheet. From this point of view, the lower limit of the average number is more preferably 5/mm, while the upper limit thereof is more preferably 12/mm, still more preferably 10/mm.

It is preferred that the foam layer has a cell flattening in at least one of the extrusion direction and transverse direction of 0.1 to 0.6, more preferably a cell flattening in each of the extrusion direction and transverse direction of 0.1 to 0.6. The cell flattening in the extrusion direction is a ratio of an average cell diameter in the thickness direction to an average cell diameter in the extrusion direction, while the cell flattening in the transverse direction is a ratio of an average cell diameter in the thickness direction to an average cell diameter in the transverse direction. The fact that the cell flattening is in the above-specified range means that the cell has an oblate shape with a cell diameter in the transverse direction and/or longitudinal direction (extrusion direction) being longer than that in the thickness direction. When the cell flattening is excessively small (namely, when cells are overly flattened), not only the surface protecting performance of the foam sheet is deteriorated, but also there is a possibility that the foam sheet shows a significant degree of sag. Therefore, the foam sheet is difficult to handle as a packaging material such as an interleaf sheet for glass plates. On the other hand, when the cell flattening is excessively large (namely cells are nearly spherical), there is a possibility that variation in thickness in the transverse direction (called corrugation) is apt to be brought about during the extrusion foaming, though such a spherical shape is not undesirable per se. Further, there is a possibility that the foam sheet has not only poor appearance but also has a lowered thickness precision. From the above point of view, the cell flattening in each direction is more preferably 0.2 to 0.5, still more preferably 0.2 to 0.4.

The average cell wall thickness "th" [μm] may be determined from the following formula:

$$th[\mu m]=(0.46/\rho p)\times \rho f\times D$$

where D is an average cell diameter [μm] of the foam layer, ρp is a density [g/cm$^3$] of the base resin of the foam layer and ρf is an apparent density [g/cm$^3$] of the foam layer.

The average cell diameter D of the foam layer is determined from the formula shown below according to ASTM D3576-77:

$$D=(\text{Arithmetic mean [μm] of average cell chord lengths in the three directions (thickness, transverse and extrusion directions)})/0.616.$$

The apparent density of the foam layer may be determined by dividing the weight per unit area [g/m$^2$] of the foam layer by the average thickness thereof, followed by unit conversion into [kg/m$^3$]. The weight per unit area [g/m$^2$] of the foam layer, namely the basis weight of the foam layer, may be determined as follows. When the foam sheet is a single layer foam sheet, a square sample with a 100 mm×100 mm size is cut out of the foam sheet. The basis weight of the foam layer is obtained by multiplying the weight [g] of the sample by 100. When the foam sheet is a multi-layer foam sheet, a square sample with a 100 mm×100 mm size is cut out of the multi-layer foam sheet and the weight [g] of the sample is multiplied by 100 to obtain a basis weight of the multi-layer foam sheet. From the obtained basis weight [g/m$^2$] of the multi-layer foam sheet, the basis weight [g/m$^2$] of the resin layer, which is determined by the hereinafter described method, is subtracted to give the basis weight of the foam layer.

The average thickness of the foam layer is the above-mentioned average (B) when the foam sheet is a single layer foam sheet. In the case of a multi-layer foam sheet, the average thickness of the foam layer is obtained by subtracting an average thickness of a resin layer, which is determined by the hereinafter described method, from the above-mentioned average (B).

The average number of cells in the thickness direction is measured as follows. Enlarged microscopic photographs (30 fold magnification) are taken at five randomly selected portions of a vertical cross-section of the foam layer along each of the extrusion direction and transverse direction thereof, thereby obtaining a total ten microscopic photographs. At a randomly selected point on each of the photographs, a straight line is drawn, through the entire thickness of the foam layer, in the direction which coincides with the thickness direction of the foam sheet. The number of cells that intersect this straight line is counted. The counted number of cells is divided by a length [mm] of the line segment between the both surfaces of the foam layer to obtain the number of cells per unit length [number/mm]. The arithmetic mean of the numbers of cells per unit length [number/mm] in the 10 points of the 10 photographs represents the average number of cells in the thickness direction of the foam layer.

The cell flattening is measured by the method described below. The cell flattening in a vertical cross-section of the foam layer along the transverse direction is a value calculated as a ratio (T1/W) of an average cell diameter T1 in the thickness direction to an average cell diameter W in the transverse direction. The average cell diameter T1 in the thickness direction and the average cell diameter W in the transverse direction may be determined as follows. To determine the average cell diameter T1 in the thickness direction, a straight line segment is drawn, through the entire thickness of the foam layer, in the thickness direction of the foam layer at a position near the center of a vertical cross-section (transverse, vertical cross-section). The number of cells that intersect this line segment is counted. The length of the line segment is divided by the counted cell number to give the average cell diameter T1 [mm] in the thickness direction. To determine the average cell diameter W in the transverse direction, a straight line segment with a length of 30 mm is drawn in the transverse direction at a position near the center of the transverse, vertical cross-section. The number of cells that intersect this line segment is counted. The length of the line segment is divided by the (counted cell number minus 1) to give the average cell diameter W [mm] in the transverse direction. The above measurements are performed on 5 randomly selected transverse, vertical cross-sections. The arithmetic mean values of the 5 average cell diameter values for respective directions represent the average cell diameter T1 in the thickness direction and the average cell diameter W in the transverse direction.

The cell flattening in a vertical cross-section of the foam layer along the extrusion direction is a value calculated as a ratio (T2/L) of an average cell diameter T2 in the thickness direction to an average cell diameter L in the extrusion direction. The average cell diameter T2 in the thickness direction and the average cell diameter L in the extrusion direction may be determined as follows. To determine the average cell diameter T2 in the thickness direction, the foam sheet is vertically cut along the extrusion direction at a portion near the center of the transverse direction. A straight line segment is drawn, through the entire thickness of the foam layer, in the thickness direction of the cross-section of the test piece (vertical cross-section along the extrusion direction). The number of cells that intersect this line segment is counted. The length of the line segment is divided by the counted cell number to give the average cell diameter T2 [mm] in the thickness direction. To determine the average cell diameter L in the extrusion direction, a straight line segment with a length of 30 mm is drawn in the extrusion direction at a position near the center of the vertical cross-section along the extrusion direction. The number of cells that intersect this line segment is counted. The length of the line segment is divided by the (counted cell number minus 1) to give the average cell diameter L [mm] in the extrusion direction. The above measurements are performed on 5 randomly selected vertical cross-sections along the extrusion direction. The arithmetic mean values of the 5 average cell diameter values for respective directions represent the average cell diameter T2 in the thickness direction and the average cell diameter L in the extrusion direction.

The foam sheet of the present invention preferably has a 25% compressive stress of 10 kPa or higher, more preferably 12 kPa or higher, still more preferably 14 kPa or higher. When the compressive stress of a foam sheet is excessively low, there is a possibility that the sheet is ill-suited for use as a cushioning material such as an interleaf sheet. The upper limit of the compressive stress is generally 40 kPa, preferably 30 kPa.

The compressive stress of the foam sheet is measured according to JIS Z0234(1976), Method A as follows. The foam sheet is cut to obtain a test piece having a length of 50 mm, a width of 50 mm and a thickness thereof. After being allowed to stand at 25° C. under relative humidity of 65% for 24 hours, the test piece is compressed at a compression rate of 10 mm/min until a thickness of 80% of the thickness of the test piece is reached. Subsequently, the compression is released to terminate the measurement. The load at which the strain amount is 25% is readout, divided by the area (2,500 mm$^2$) of the compressed test piece and then subjected to unit conversion to [kPa], thereby obtaining the 25% compressive stress.

It is necessary that the foam sheet of the present invention must exhibit a dimensional change of −5% to 0% in the extrusion direction when heated at 80° C. for 24 hours. The fact that the dimensional change has a large negative value (shrinkage is high) means that the foam sheet has been highly stretched in the extrusion direction at the time of extrusion foaming. A foam sheet having a dimensional change of less than −5% is also low in compressive stress and may not be used as an interleaf sheet. From this point of view, the lower limit of the dimensional change is preferably −4%. The upper limit of the extruded polyethylene-based resin foam sheet is 0%.

For the same reasons as described above, the foam sheet preferably shows a dimensional change of −5% to 0% in the transverse direction when heated at 80° C. for 24 hours. The lower limit of the dimensional change is preferably −3%, more preferably −2%.

As used herein the dimensional change is measured as follows. A measurement sample having a length in the extrusion direction of 200 mm, a length in the transverse direction of 200 mm and a thickness equal to the foam sheet is prepared, then allowed to stand in a thermostatic chamber (temperature of 23° and humidity of 50%) for 24 hours, and is measured for its dimensions in the extrusion and transverse directions. Thereafter, the sample is heated for 24 hours in an oven maintained at 80° C. The sample is taken out of the oven, allowed to stand for 24 hours in the thermostatic chamber and then again measured for its dimensions in the extrusion and transverse directions. A change in dimension in each of the extrusion and transverse directions is calculated according to the following formula:

$$\text{Dimensional change upon heating (\%)} = (([\text{Dimension after heating}] - [\text{Dimension before heating}])/[\text{Dimension before heating}]) \times 100$$

The foam sheet of the present invention may be embodied in a multi-layer sheet having a resin layer laminated on one side or both sides of the foam layer. By laminating the resin layer, the foam sheet has an improved strength and, additionally, is easily imparted with functionalities such as antistatic property.

For reasons of easiness in adhesion to the foam layer and of excellency in flexibility and production stability, a polyethylene-based resin is preferably used as the resin for the resin layer. As the polyethylene-based resin, there may be mentioned those which are used for the above-described foam sheet.

The resin layer preferably has a basis weight of 0.5 to 10 g/m$^2$, more preferably 1 to 5 g/m$^2$, per one side. When the basis weight is excessively small, there is a possibility that improvement in strength and impartment of functionalities are insufficient. When the basis weight is excessively large, on the other hand, there is a possibility that the foam layer is prevented from properly forming at the time of lamination of the resin layer by coextrusion, since the amount of heat of the molten resin for forming the resin layer is excessively large.

The basis weight of the resin layer may be measured as follows. An enlarged image of a vertical cross-section of a foam sheet having a foam layer and a resin layer laminated thereon is prepared using, for example, a microscope. The cross-section is measured for the thickness of the resin layer at 10 equally spaced apart positions. The arithmetic mean of the ten measured values represents an average thickness of the resin layer. The basis weight [g/m$^2$] of the resin layer is given by multiplying the average thickness by the density of the base resin from which the resin layer is formed, followed by unit conversion.

The above method may be employed only when there is clear boundary between the resin layer and the foam layer.

When the boundary between the resin layer and the foam layer is not clear and when the foam sheet is produced by coextrusion or extrusion lamination, the basis weight [g/m$^2$] of the resin layer may be obtained from the extrusion foaming conditions employed in the production of the foam sheet according to the following equation (1):

$$\text{Basis weight } [g/m^2] = 1000X/(L \times W) \quad (1)$$

wherein X represents a discharge rate [kg/hour] of the resin layer, W represents a width [m] of the foam sheet and L represents a length [m/hour] produced per unit time. When the resin layer is laminated on both sides of the foam layer, the basis weights of the resin layers are determined from discharge rates of respective resin layers.

A functional additive may be incorporated into the resin layer to make the foam sheet in the form of a functional multi-layer foam sheet. Examples of the functional additive include an antistatic agent, an anti-corrosive agent, an anti-fogging agent, an antimicrobial agent, a coloring agent, a heat stabilizer, a weatherability agent, a UV absorbing agent and a flame retardant.

When an antistatic agent is incorporated as a functionality additive into the resin layer, it is preferred that a polymeric antistatic agent is used as the antistatic agent. By incorporation of the polymeric antistatic agent, the resin layer may be imparted with a surface resistivity of $1 \times 10^7$ to $1 \times 10^{14} \Omega$. When the surface resistivity is within the above range, the multi-layer foam sheet exhibits sufficient antistatic property. From this point of view, the surface resistivity is preferably $5 \times 10^{13} \Omega$ or less, more preferably $1 \times 10^{13} \Omega$ or less. As the polymeric antistatic agent, there may be mentioned those which are available from Sanyo Chemical Industries, Ltd. under the trade names of PELESTAT VL300, PELESTAT HC250, PELECTRON HS and PELECTRON PVH.

The surface resistivity as used herein is measured according to JIS K6271(2001) after subjecting a test piece to a conditioning adjustment. More specifically, a test piece (having a length of 100 mm, a width of 100 mm and a thickness equal to that of the foam sheet to be measured) is cut out of the foam sheet and subjected to the conditioning adjustment by being allowed to stand in an environment with a temperature of 20° C. and a relative humidity of 30% for 36 hours. Then the test piece is impressed with a voltage of 500 kV and measured for the surface resistivity 1 minute after the commencement of the voltage impression.

In order to obtain a multi-layer foam sheet having sufficient antistatic property, the polymeric antistatic agent is preferably incorporated into the resin layer in an amount of 5 to 150 parts by weight per 100 parts by weight of the resin of which the resin layer is constituted. From this point of view, the polymeric antistatic agent is more preferably incorporated into the resin layer in an amount of 10 to 120 parts by weight, still more preferably 20 to 100 parts by weight per 100 parts by weight of the resin of which the resin layer is constituted.

A method for producing the foam sheet is next described. The foam layer which constitutes the foam sheet is produced by extrusion foaming. In one example of the extrusion foaming, the above-described polyethylene-based resin, a cell controlling agent and, if necessary, an additive are fed to an extruder and heated and melted to obtain a resin melt. A physical blowing agent is injected into the resin melt and they are kneaded to obtain a foamable resin melt. After the temperature of the foamable resin melt in the extruder has been adjusted to a temperature (resin temperature) at which the foamable resin melt is able to be foamed, the foamable melt is extruded through a circular die and released through a lip at a tip of the die to the atmosphere, so that the foamable resin melt is foamed to obtain a tubular foam product. The tubular foam product is drawn and enlarged (blow-up) over a mandrel and cut open in the extrusion direction to obtain the intended foam sheet.

As the cell controlling agent, there may be used inorganic powder or a chemical blowing agent. Examples of the inorganic powder include talc, zeolite, silica and calcium carbonate. Examples of the chemical blowing agent include azodicarbonamide, hydrazodicarbonamide, azobisisobutyronitrile, sodium bicarbonate and sodium bicarbonate-citric acid-type chemical blowing agent which is a mixture of sodium bicarbonate and citric acid or a monoalkali metal salt of citric acid such as sodium citrate. Among these chemical blowing agents, sodium bicarbonate-citric acid-type chemical blowing agent is preferred in order to obtain a foam sheet having small cell diameter and excellent cushioning property.

The addition amount of the chemical blowing agent is preferably 0.1 to 3 parts by weight, more preferably 0.2 to 2 parts by weight, based on 100 parts by weight of the base resin. Too small an addition amount causes a difficulty in adjustment of the cell diameter in a desired range. Too large an addition amount, on the other hand, causes excessively small cell diameter and increased tendency of breakage of the cell structure of the foam sheet.

The physical blowing agent may be organic or inorganic physical blowing agent. As the organic physical foaming agent, there may be mentioned, for example, aliphatic hydrocarbons such as propane, n-butane, isobutane, n-pentane, isopentane, n-hexane and isohexane, alicyclic hydrocarbons such as cyclopentane and cyclohexane, chlorinated hydrocarbons such as methyl chloride and ethyl chloride, fluorinated hydrocarbons such as 1,1,1,2-tetrafluoroethane and 1,1-difluoroethane, ethers such as dimethyl ether and methyl ethyl ether, and alcohols such as methanol and ethanol. As the inorganic physical foaming agent, there may be mentioned, for example, oxygen, nitrogen, carbon dioxide, air and water. These physical blowing agents may be used as a mixture of two or more thereof. Above all, organic physical blowing agents, particularly those which contain as their major ingredient n-butane, isobutane or a mixture thereof, are preferred for reasons of foaming efficiency.

The addition amount of the blowing agent is controlled in view of the kind of the blowing agent and the intended apparent density. When a butane-containing mixture such as a mixture of 30% by weight of isobutane and 70% by weight of n-butane is used as a physical blowing agent, the addition amount thereof is 4 to 35 parts by weight, preferably 5 to 30 parts by weight, more preferably 6 to 25 parts by weight, based on 100 parts by weight of the base resin.

The above-mentioned resin temperature is preferably 100 to 120° C., more preferably 105 to 115° C. When the resin temperature is excessively low, there is a possibility that a desired foam product is not obtainable. When the resin temperature is excessively high, on the other hand, the melt viscosity of the foamable resin melt become so low that there is a possibility that a desired foam product is not obtainable.

In general, the thickness of a foam sheet may be controlled by controlling the amount of a blowing agent, the ratio of a discharge rate of the foam product to a drawing rate thereof, the blow-up ratio (mandrel diameter/lip diameter), the clearance of the lip, etc. In order to decrease the thickness of a foam sheet while keeping the apparent density thereof unchanged, it is necessary to increase the drawing rate ratio or the blow-up ratio. However, when these ratios are increased excessively, the cells are excessively flattened so that the compressive stress of the foam sheet is lowered and, therefore, the cushioning property thereof is lowered. When these ratios are high, the foam sheet is forcibly stretched so that through-holes are apt to be formed in the thickness direction of the foam sheet.

The foam sheet of the present invention is produced using a reduced die lip clearance as compared with that in the conventional foam sheet production. A reduction of the clearance allows the production of a thin sheet without excessive increase of the drawing rate ratio and blow-up ratio. Further, because the foam sheet is not forcibly stretched, the foam sheet is small in dimensional change when heated. In the production of conventional foam sheets with a thickness of about 0.5 mm, the lip clearance has been sufficiently reduced. In the case of the present invention, since the clearance is further reduced in order to produce the foam sheet having a much thinner thickness, the production of the foam sheet encounters a difficulty that through-holes are apt to be formed in the foam sheet produced.

On the other hand, the formation of through-holes that penetrate through the foam sheet can be effectively prevented when the chemical blowing agent having an average particle diameter of 3 to 8 μm, preferably sodium bicarbonate-citric acid-type chemical blowing agent having an average particle diameter of 3 to 8 μm, is used as the cell controlling agent. When the average particle diameter is excessively large, pinholes are apt to be formed in the foam sheet obtained. From this point of view, the average particle diameter is preferably 4 to 7 μm. It is also preferred that the chemical blowing agent has a maximum particle diameter of 100 μm or less, more preferably 80 μm or less. As used herein, the average particle diameter is intended to refer to median diameter (d50) measured by laser diffraction/scattering grain size distribution measurement. The maximum particle diameter of the chemical blowing agent is determined as follows. A group of particles (about 1 to 3 mg) of the chemical blowing agent is randomly sampled and subjected to magnification observation with an optical microscope or the like. The maximum particle diameter is the long-axis length of that particle which has the longest long-axis length among the group of particles.

The chemical blowing agent having an average particle diameter of 3 to 8 μm may be obtained by, for example, pulverizing a chemical blowing agent produced by the conventional method. The pulverization method may be pulverization with a jet mill or pulverization with a high revolution mill. When the pulverization is carried out using the jet mill or the like mill, the average particle diameter of the chemical blowing agent may be made smaller by repeating the pulverization or by prolonging the pulverization time.

When a mixture of low density polyethylene and linear low density polyethylene is used as a base resin of the foam layer, formation of through-holes may be effectively prevented. When linear low density polyethylene is compounded into low density polyethylene, the resulting mixture exhibits improved elongation at the time of extrusion foaming. For this reason, formation of pinholes is unlikely to occur in the foam sheet obtained from the mixture. The amount of the linear low density polyethylene is preferably 5 to 20% by weight based on the total weight of the low density polyethylene and the linear low density polyethylene (namely the weight ratio of the low density polyethylene to the linear low density polyethylene is 95:5 to 80:20).

It is preferred that the ratio of the mandrel diameter to the outlet port diameter of the circular die (blow-up ratio of the mandrel diameter/circular die lip diameter) is 2.2 to 3.8. When the blow-up ratio is excessively low, a phenomenon of waviness of the foam sheet in the circumferential direction at the time of foaming cannot be reduced and, hence, there is a possibility that a foam sheet with excellent thickness precision is not obtainable. When the blow-up ratio is excessively high, there is a possibility that cells of the foam sheet are excessively flattened in the transverse direction of the sheet.

In order to obtain a foam sheet whose thickness falls within the above-described range and which satisfies both thickness precision (1) and (2), it is desirable to control the temperature of the die, particularly the die lip. More specifically, in order to obtain such a foam sheet, it is desired that the temperature control in the circumferential direction of the circular die is done by individual control. For example, it is preferred that the temperature control is done individually in each of circumferentially divided 4 sections, preferably 8 to 16 sections.

As a method of lamination of a resin layer on a foam layer, there may be used, for example, extrusion lamination and coextrusion. The coextrusion foaming process is preferred for reasons that the thickness of the resin layer may be made small and the adhesion strength between the resin layer and foam layer may be high.

In the coextrusion foaming process, use is made of a device having an extruder for forming a foam layer, an extruder for forming a resin layer and a coextrusion circular die to which the above extruders are connected. In the coextrusion foaming process, a foamable resin melt is first prepared as described previously in the extruder for forming a foam layer. At the same time, a resin for forming the resin layer is fed to the extruder for forming the resin layer, where it is heated, melted, knead and, if necessary, added, and melt-kneaded with a volatile plasticizer to obtain a resin melt for forming the resin layer. These melts are fed to the coextrusion circular die and layered and coextruded to obtain a foam sheet having the resin layer laminated on the foam layer.

In the coextrusion foaming process, a volatile plasticizer is preferably incorporated into the resin melt for forming the resin layer. As the volatile plasticizer, a substance which has a function to lower the melt viscosity of the resin melt for forming the resin layer and which disappears by vaporization from the resin layer after the formation of the resin layer is preferably used. When the volatile plasticizer is incorporated into the resin melt for forming the resin layer, the extrusion resin temperature for the resin melt for forming the resin layer can be made near the extrusion resin temperature for the resin melt for forming the foam layer (temperature lowering effect). Additionally, melt stretchability of the resin layer in a molten state is significantly improved (stretchability improving effect). Thus, because of the temperature lowering effect, the cell structure of the foam layer is less likely to be broken by the heat of the resin layer at the time of the coextrusion foaming. Further, because of the stretchability improving effect, the resin layer can be stretched following the foam layer which is stretched during the foaming stage. This can prevent the formation of cracks on a surface of the foam sheet which might otherwise occur due to insufficient stretchability of the resin layer.

The volatile plasticizer is preferably at least one selected from aliphatic hydrocarbons or alicyclic hydrocarbons having 2 to 7 carbon atoms, aliphatic alcohols having 1 to 4 carbon atoms and aliphatic ether having 2 to 8 carbon atoms. When a low volatile substance such as a lubricant is used as the plasticizer, the low volatile plasticizer remains in the resin layer and may stain a surface of a material, such as a glass, to be packaged. In contrast, the volatile plasticizer is preferable because it can efficiently plasticize the resin constituting the resin layer and because it hardly remains in the obtained resin layer.

The volatile plasticizer used may easily volatilize from the resin layer and has a boiling point of preferably 120° C. or less, more preferably 80° C. or less. When the foam sheet obtained by coextrusion is allowed stand, the volatile plasticizer which has a boiling point in the above range spontaneously volatilizes and is spontaneously removed from the resin layer by heat remaining therein immediately after the coextrusion and, further, by succeeding gas permeation at room temperature. The lower limit of the boiling point is about −50° C.

It is preferred that the addition amount of the volatile plasticizer is 7 to 50 parts by weight based on 100 parts by weight of a total amount of the resin for forming the resin layer and other resin components, such as a polymeric antistatic agent, which are added as necessary. From the standpoint of the above-described temperature lowering effect and stretchability improving effect, the addition amount of the volatile plasticizer is preferably at least 9 parts by weight, more preferably at least 10 parts by weight.

On the other hand, when the addition amount of the volatile plasticizer is about 50 parts by weight or less, the volatile plasticizer can penetrate and mix into the resin melt for forming the resin layer without causing deterioration of the physical properties of the resin layer. As a consequence, the volatile plasticizer is prevented from spurting from the die lip, and so it is possible to fully suppress formation of holes in the resin layer and formation of surface undulations in the multi-layer foam sheet. Thus, the obtained multi-layer foam sheet has excellent smoothness. From this point of view, the addition amount of the volatile plasticizer is preferably 40 parts by weight or less, more preferably 30 parts by weight or less, still more preferably 25 parts by weight or less. When the addition amount of the volatile plasticizer is within the above-described range, it is possible to ensure both of the effect of lowering the extrusion resin temperature for the resin melt for forming the resin layer at the time of the coextrusion and the effect of improving the stretchability thereof.

The above-mentioned cell flattening T1/W and T2/L may be adjusted as follows. The cell shape in the extrusion direction may be adjusted by changing a balance between the discharge rate from the die lip and the drawing rate. More specifically, the ratio of the cell diameter in the thickness direction to the cell diameter in the extrusion direction increases by reducing the ratio of the drawing rate to the discharge rate. For example, when the discharge amount is the same, the above cell diameter ratio increases by reducing the clearance of the lip so as to increase the discharge rate while maintaining the drawing rate unchanged. On the other hand, the ratio of the cell diameter in the thickness direction to the cell diameter in the extrusion direction decreases by increasing the ratio of the drawing rate to the discharge rate. For example, the above cell diameter ratio decreases by widening the clearance of the lip so as to decrease the discharge rate while maintaining the discharge amount and drawing rate unchanged, or by increasing the drawing rate while maintaining the discharge amount and the discharge rate unchanged.

When an adjustment is desired so as to decrease the cell diameter in the thickness direction relative to the cell diameter of the transverse direction, a method may be feasible in which a blow-up ratio is increased. When an adjustment is desired so as to increase the cell diameter in the thickness direction relative to the cell diameter in the transverse direction, a method may be feasible in which a blow-up ratio is reduced.

When the ratio of the drawing rate to the discharge rate is increased, a dimensional change (shrinkage) of the foam sheet in the extrusion direction increases at the time of heating of the foam sheet at 80° C. When the blow-up ratio is increased, a dimensional change (shrinkage) of the foam sheet in the transverse direction increases at the time of heating of the foam sheet at 80° C.

EXAMPLES

The following examples and comparative examples will describe the present invention in more detail. The present invention is, however, not limited to the examples.

Polyethylene-Based Resin:

The polyethylene-based resins used in the examples and comparative examples are shown in Table 1.

TABLE 1

| Abbreviation | Kind | Maker | Product name | Density (kg/m$^3$) | Melting point (° C.) | MFR (g/10 min) |
| --- | --- | --- | --- | --- | --- | --- |
| LD1 | low density polyethylene | Dow Chemical Japan Limited | NUC8008 | 918 | 108 | 4.7 |
| LD2 | low density polyethylene | Dow Chemical Japan Limited | NUSC8321 | 922 | 112 | 2.4 |
| LD3 | low density polyethylene | Dow Chemical Japan Limited | NUC8009 | 917 | 107 | 9 |
| LL1 | linear low density polyethylene | Tosoh Corporation | M55 | 920 | 114 | 8 |

Cell Controlling Agent:

As a cell controlling agent, used was made of a chemical blowing agent (abbreviation: SC1) which is a mixture of sodium bicarbonate and sodium citrate with a weight ratio of 1:1 and which has an average particle diameter (d50) of 6 µm and a maximum particle diameter of 30 µm.

Antistatic Agent:

As an antistatic agent, use was made of a polymeric antistatic agent "PELESTAT VL300" (abbreviation: AS1) manufactured by Sanyo Chemical Industries, Ltd.

Apparatus:

A multi-layer foam sheet production apparatus was composed of a tandem extruder for forming a foam sheet having a first extruder with a screw diameter of 115 mm and a second extruder with a screw diameter of 150 mm connected downstream of the first extruder, and a third extruder for forming a resin layer with a screw diameter of 65 mm. Each of the outlet sides of the tandem extruder and the third extruder was connected to a circular die for coextrusion. When a foam sheet composed only of a foam layer was produced, the third extruder for forming the resin layer was not operated and only the tandem extruder was used. In either case, the temperature control of the die lip was independently carried out for each of eight divided sections of the die lip.

Examples 1 to 3 and Comparative Examples 1 and 2

A polyethylene-based resin and a cell controlling agent shown in Table 2 were fed to a feed inlet port of the first extruder in amounts shown in Table 2 and melted and kneaded to obtain a resin melt with a controlled temperature of about 200° C. Then, mixed butane composed of 70% by weight of n-butane and 30% by weight of isobutane as a physical blowing agent was injected into the resin melt in an amount shown in Table 2 based on 100 parts by weight of the polyethylene-based resin and melted and kneaded. The kneaded mass was then fed to the second extruder and cooled to obtain a foamable resin melt having a resin temperature shown in Table 2. The foamable resin melt was then introduced into the coextrusion circular die. The amounts of the cell controlling agent and physical blowing agent shown in Table 2 are each part by weight thereof based on 100 parts by weight of the resin that constitutes the foam layer.

At the same time, a polyethylene-based resin and polymeric antistatic agent shown in Table 2 and a volatile plasticizer shown in Table 2 were fed to the third extruder and melted and kneaded to obtain a resin melt for forming a resin layer. The melt was adjusted to a resin temperature shown in Table 2 and fed to the coextrusion circular die. Within the coextrusion die, the melts were combined such that the melt for forming a resin layer was laminated on each of the inner and outer sides of the melt for forming a foam layer and coextruded as a laminated melt into the atmosphere to obtain a tubular laminate foam product with a three-layered structure of (resin layer)/(foam layer)/(resin layer). The laminate foam product was drawn at a drawing rate shown in Table 2 while being enlarged over a mandrel with a blow-up ratio shown in Table 2, and cut open in the extrusion direction. The sheet was wound into a roll having a length shown in Table 3 to obtain the intended foam sheet composed of a foam layer and resin layers laminated on both sides of the foam layer. The amount of the volatile plasticizer shown in Table 2 is part by weight thereof based on 100 parts by weight of the total of polyethylene-based resin and polymeric antistatic agent that constitutes the foam layer.

Example 4 and Comparative Example 3

A polyethylene-based resin, a polymeric antistatic agent and a cell controlling agent shown in Table 2 were fed to a feed inlet port of the first extruder in amounts shown in Table 2 and melted and kneaded to obtain a resin melt with a controlled temperature of about 200° C. Then, mixed butane composed of 70% by weight of n-butane and 30% by weight of isobutane as a physical blowing agent was injected into the resin melt in an amount shown in Table 2 based on 100 parts by weight of the polyethylene-based resin and melted and kneaded. The kneaded mass was then fed to the second extruder and cooled to obtain a foamable resin melt having a resin temperature shown in Table 2. The foamable resin melt was then extruded through the circular die into the atmosphere to obtain a tubular foam sheet. The tubular foam sheet was drawn at a drawing rate shown in Table 2 while being enlarged over a mandrel with a blow-up ratio shown in Table 2, and cut open in the extrusion direction to obtain a foam sheet composed only of a foam layer. The sheet was wound into a roll having a length shown in Table 3.

The physical properties of the foam sheet obtained in the Examples and Comparative Examples are shown in Tables 3 and 4.

TABLE 2

| | Foam layer | | | Resin layer | |
|---|---|---|---|---|---|
| | Resin composition Kind Weight ratio | Cell controlling agent Kind Amount (parts by weight) | Physical blowing agent Kind Amount (parts by weight) | Resin composition Kind Weight ratio | Volatile plasticizer Kind Amount (parts by weight) |
| Example 1 | LD3/LL1 = 90/10 | SC 1 1.4 | Mixed butane 6.2 | LD3/AS1 = 75/25 | Mixed butane 10 |
| Example 2 | LD1/LL1 = 90/10 | SC 1 1.2 | Mixed butane 8.2 | LD3/AS1 = 75/25 | Mixed butane 15 |
| Example 3 | LD2 = 100 | SC 1 1.5 | Mixed butane 14.2 | LD3/AS1 = 75/25 | Mixed butane 14 |
| Example 4 | LD3/AS1 = 80/20 | SC 1 3.2 | Mixed butane 2.8 | — | — |
| Comparative Example 1 | LD2 = 100 | SC 1 1.5 | Mixed butane 14.2 | LD3/AS1 = 75/25 | Mixed butane 14 |
| Comparative Example 2 | LD2 = 100 | SC 1 1.3 | Mixed butane 14.2 | LD3/AS1 = 75/25 | Mixed butane 14 |
| Comparative Example 3 | LD1/AS1 = 80/20 | SC 1 3.5 | Mixed butane | — | — |

TABLE 2-continued 1.5

| | Production conditions | | | | | |
|---|---|---|---|---|---|---|
| | Apparatus | | Resin Temperature | | Discharge amount | | |
| | Lip diameter (mm) | Blow-up ratio | Foam layer (° C.) | Resin layer (° C.) | Foam layer (kg/h) | Resin layer (kg/h) | Drawing rate (m/min) |
| Example 1 | 160 | 2.65 | 113 | 120 | 140 | 15 | 77.5 |
| Example 2 | 135 | 3.15 | 115 | 120 | 140 | 15 | 94 |
| Example 3 | 120 | 3.54 | 113 | 120 | 100 | 12 | 70.1 |
| Example 4 | 160 | 2.34 | 112 | — | 130 | — | 46.7 |
| Comparative Example 1 | 120 | 3.54 | 112 | 120 | 100 | 12 | 92 |
| Comparative Example 2 | 120 | 3.54 | 112 | 120 | 140 | 15 | 90 |
| Comparative Example 3 | 200 | 1.88 | 118 | — | 130 | — | 23.1 |

TABLE 3

| | Apparent density kg/m³ | Average thickness mm | Average cell number in thickness direction number/mm | Average cell wall thickness μm | Cell flattening MD | Cell flattening TD | Length of 1 roll m | 25% Compressive stress kPa | Dimensional change upon heating MD % | Dimensional change upon heating TD % | Presence of through-hole in 1 roll |
|---|---|---|---|---|---|---|---|---|---|---|---|
| Example 1 | 150 | 0.16 | 9 | 23 | 0.26 | 0.37 | 600 | 14 | −3.1 | −0.8 | good |
| Example 2 | 120 | 0.19 | 10 | 20 | 0.32 | 0.39 | 600 | 18 | −3.4 | −0.4 | good |
| Example 3 | 66 | 0.21 | 9 | 9 | 0.49 | 0.54 | 1000 | 10 | −3.5 | −1.1 | good |
| Example 4 | 302 | 0.13 | 12 | 40 | 0.33 | 0.48 | 300 | 22 | −2.5 | −0.5 | good |
| Comparative Example 1 | 85 | 0.19 | 8 | 57 | 0.08 | 0.18 | 1000 | 6 | −6.1 | −1.5 | good |
| Comparative Example 2 | 65 | 0.38 | 5 | 14 | 0.58 | 0.76 | 600 | 15 | −2.8 | −1.3 | good |
| Comparative Example 3 | 620 | 0.13 | 12 | 55 | 0.53 | 0.81 | 300 | 35 | −1.5 | −0.2 | good |

TABLE 4

| | Thickness precision (1) | | | | | Thickness precision (2) Largest thickness in 5 divided sections (mm) | | |
|---|---|---|---|---|---|---|---|---|
| | Average thickness (A) (mm) | | Average (B) (mm) | B × 0.8 (mm) | B × 1.2 (mm) | | | Difference (mm) |
| | Minimum | Maximum | | | | Maximum | Minimum | |
| Example 1 | 0.132 | 0.171 | 0.158 | 0.126 | 0.190 | 0.184 | 0.172 | 0.012 |
| Example 2 | 0.183 | 0.215 | 0.194 | 0.155 | 0.233 | 0.229 | 0.213 | 0.016 |
| Example 3 | 0.185 | 0.249 | 0.214 | 0.171 | 0.257 | 0.318 | 0.290 | 0.028 |
| Example 4 | 0.122 | 0.141 | 0.133 | 0.106 | 0.160 | 0.148 | 0.135 | 0.013 |
| Comparative Example 1 | 0.165 | 0.241 | 0.192 | 0.154 | 0.230 | 0.245 | 0.162 | 0.083 |
| Comparative Example 2 | 0.358 | 0.421 | 0.384 | 0.307 | 0.461 | 0.465 | 0.428 | 0.037 |
| Comparative Example 3 | 0.125 | 0.143 | 0.131 | 0.105 | 0.157 | 0.148 | 0.138 | 0.010 |

The MFR shown in Table 1; the apparent density, average thickness, average cell wall thickness, average cell number in the thickness direction, cell flattening, 25% compressive stress and dimension changes in the extrusion direction (MD) and in the transverse direction (TD) upon heating shown in Table 3; and the thickness precision shown in Table 4 were measured according to the methods described previously. The melting point shown in Table 1 was a fusion peak temperature determined from a DSC curve obtained by heat flux differential scanning calorimetry as referenced in JIS K7121(1987), "Condition Adjustment (2), "measurement of fusion temperature after test piece has been subjected to determined heat treatment".

The 25% compressive stress shown in Table 3 is an arithmetic mean of the measured values for 5 test pieces randomly cut out from the foam sheet. The dimension changes in the extrusion direction (MD) and in the transverse direction (TD) upon heating shown in Table 3 are each also an arithmetic mean of the measured values for 5 test pieces randomly cut out from the foam sheet.

The formation of through-holes was evaluated according to the criteria shown below from the number of through-holes measured by defect a measuring device on the foam sheet produced:

good: Through-holes with a diameter of 1 mm or more are not at all present in the continuous product (1 roll) of the foam sheet.

poor: Through-holes with a diameter of 1 mm or more are present in the continuous product (1 roll) of the foam sheet.

The invention claimed is:

1. An extruded polyethylene-based resin foam sheet having a foam layer constituted of a base resin containing low density polyethylene as a major component thereof,
    wherein cell walls of said foam layer have an average thickness of 6 to 70 μm, and
    wherein the extruded polyethylene-based resin foam sheet has an apparent density of 120 to 450 kg/m$^3$, an average thickness between 0.03 mm and 0.15 mm, and a dimensional change of −5% to 0% in the extrusion direction when heated at 80° C. for 24 hours and has a 25% compression stress of 10 kPa or more in the thickness direction of the extruded polyethylene-based resin foam sheet.

2. The foam sheet according to claim 1, wherein said base resin additionally contains linear low density polyethylene in an amount of 5 to 20% by weight based on the total weight of the low density polyethylene and linear low density polyethylene.

3. The foam sheet according to claim 1, further comprising a resin layer laminated on at least one side of said foam layer.

4. An interleaf sheet for glass plates that is formed of the foam sheet according to claim 1.

5. The foam sheet according to claim 2, further comprising a resin layer laminated on at least one side of said foam layer.

6. An interleaf sheet for glass plates that is formed of the foam sheet according to claim 2.

7. An interleaf sheet for glass plates that is formed of the foam sheet according to claim 3.

8. The extruded polyethylene-based resin foam sheet according to claim 1, wherein an average number of cells in a thickness direction of the foam layer is 4 to 15/mm.

9. The extruded polyethylene-based resin foam sheet according to claim 6, wherein the foam layer has a cell flattening in at least one of an extrusion direction and transverse direction of 0.1 to 0.6.

10. The extruded polyethylene-based resin foam sheet according to claim 1, wherein the extruded polyethylene-based resin foam sheet has an apparent density of 150 to 450 kg/m$^3$.

* * * * *